(12) United States Patent
Ohlsson et al.

(10) Patent No.: US 11,083,035 B2
(45) Date of Patent: Aug. 3, 2021

(54) METHODS, WIRELESS DEVICE AND NETWORK NODE FOR RESUMING A COMMUNICATION SESSION

(71) Applicant: Telefonaktiebolaget LM Ericsson (publ), Stockholm (SE)

(72) Inventors: Oscar Ohlsson, Stockholm (SE); Gunnar Mildh, Sollentuna (SE); Paul Schliwa-Bertling, Ljungsbro (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/613,554

(22) PCT Filed: Jun. 14, 2018

(86) PCT No.: PCT/SE2018/050624
§ 371 (c)(1),
(2) Date: Nov. 14, 2019

(87) PCT Pub. No.: WO2018/231139
PCT Pub. Date: Dec. 20, 2018

(65) Prior Publication Data
US 2021/0051753 A1 Feb. 18, 2021

Related U.S. Application Data

(60) Provisional application No. 62/520,628, filed on Jun. 16, 2017.

(51) Int. Cl.
*H04W 76/19* (2018.01)
*H04W 76/11* (2018.01)
(Continued)

(52) U.S. Cl.
CPC ............ *H04W 76/19* (2018.02); *H04W 76/11* (2018.02); *H04W 76/27* (2018.02); *H04W 74/0833* (2013.01); *H04W 84/042* (2013.01)

(58) Field of Classification Search
CPC ...... H04W 76/11; H04W 76/19; H04W 76/27
(Continued)

(56) References Cited

U.S. PATENT DOCUMENTS

2016/0309379 A1* 10/2016 Pelletier ................ H04W 76/12

FOREIGN PATENT DOCUMENTS

WO 2016068776 A1 5/2016

OTHER PUBLICATIONS

"3GPP TS 38.300 V0.4.1", 3rd Generation Partnership Project; Technical Specification Group Radio Access Network; NR; NR and NG-RAN Overall Description; Stage 2 (Release 15), Jun. 2017, pp. 1-55.

(Continued)

*Primary Examiner* — Joel Ajayi
(74) *Attorney, Agent, or Firm* — Christopher & Weisberg, P.A.

(57) ABSTRACT

Methods, wireless device (500) and network node (502) which can be used when resuming a communication session after a period of inactivity of the wireless device (500). The wireless device (500) sends to a network node (502) a resuming request comprising an indication of at least one preferred network slice out of a set of network slices that was used in the communication session before said period of inactivity. Thereby, the network node (502) is able to determine the preferred network slice(s) based on the indication in the resuming request.

10 Claims, 9 Drawing Sheets

(51) Int. Cl.
*H04W 76/27* (2018.01)
*H04W 74/08* (2009.01)
*H04W 84/04* (2009.01)

(58) Field of Classification Search
USPC .................................................... 455/422.1
See application file for complete search history.

(56) References Cited

OTHER PUBLICATIONS

"3GPP TS 38.321 V15.5.0", 3rd Generation Partnership Project; Technical Specification Group Radio Access Network; NR; Medium Access Control (MAC) protocol specification (Release 15), Mar. 2019, pp. 1-78.

"3GPP TS 38.331 V15.5.1", 3rd Generation Partnership Project; Technical Specification Group Radio Access Network; NR; Radio Resource Control (RRC) protocol specification (Release 15), Apr. 2019, pp. 1-491.

"Report of email discussion: [97bis#14][NR] Slicing", 3GPP TSG-RAN WG2 #98; R2-1704128; Hangzhou, China, May 5-15, 2017, pp. 1-37.

\* cited by examiner

600 — Send to network node a resuming request with indication of preferred network slice(s)

Fig. 6A

602 — Receive from wireless device resuming request with indication of preferred network slice(s)

604 — Determine preferred network slice(s) based on indication

METHODS, WIRELESS DEVICE AND NETWORK NODE FOR RESUMING A COMMUNICATION SESSION

TECHNICAL FIELD

The present disclosure relates generally to a wireless device, a network node and methods therein, for resuming a communication session for the wireless device in a wireless network after the wireless device has had a period of inactivity.

BACKGROUND

In this disclosure, the term "wireless device" is used to represent any communication entity capable of radio communication with a wireless network by sending and receiving radio signals, such as e.g. mobile telephones, tablets, laptop computers and Machine-to-Machine, M2M, devices also known as Machine Type Communication, MTC, devices, although this disclosure is not limited to these examples. Another common generic term in this field is "User Equipment, UE" which is frequently used herein as a representative for wireless device. Sometimes the term "user" is also used herein for short to denote a wireless device operated by a user.

Further, the term "network node", is used herein to represent a node of a wireless network that is capable of communicating radio signals with wireless devices. The network node in this disclosure may refer to a base station, eNB, gNB, radio node, Node B, base transceiver station, access point, etc., although this disclosure is not limited to these examples. gNB denotes a Next Generation NodeB. The network node in this disclosure may also refer to a node in the wireless network, such as a Radio Network Controller, RNC, that controls one or more base stations or radio nodes that communicate radio signals with wireless devices. The term "gNB", which refers to a next generation NodeB, is frequently used herein as a representative for network node. Throughout this disclosure and drawings, the example terms gNB and UE can thus be replaced by the more generic terms network node and wireless device, respectively. Further, the term "Radio Access Network RAN" is used to denote a wireless network.

Network slicing is a new concept in wireless communication as defined by 5G-CN/5G-RAN, that enables a network operator to create virtual networks optimized for a particular service or use case. The network operator can also deploy multiple network slices delivering the same service and supporting the same set of features but for different groups of UEs, e.g. dedicated to a specific customer.

Communication of data in Protocol Data Units, PDUs, is commonly referred to as a PDU session. A UE can be registered to up to 8 network slices simultaneously. For each network slice, the network can establish one or more PDU sessions for the UE to handle the traffic generated for the network slice(s). Each PDU session in turn contains different Quality of Service, QoS, flows which are mapped to one or more Data Radio Bearers, DRBs, in the RAN. As QoS flows from different PDU sessions are always mapped to different DRBs, there is a unique correspondence between a DRB and a network slice.

Figure 1:
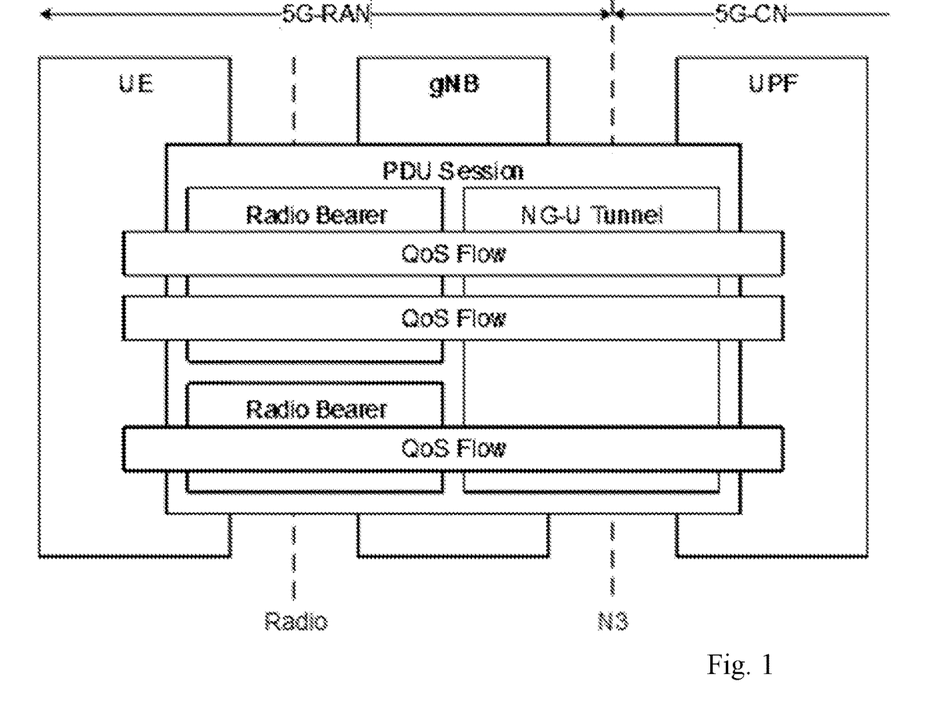
FIG. 1 is a communication scenario illustrating a PDU session for a UE with multiple radio bearers and QoS flows, according to the prior art.

FIG. 1 illustrates schematically a PDU session between a UE and a User Plane Function, UPF, which resides in a Core Network, CN. In this case, two DRBs denoted Radio Bearers are employed for communication of the data over a radio interface between the UE and a serving gNB, while the data is communicated between the gNB and the UPF over an N3 or NG-U interface using tunneling. The UE and the gNB operate in a 5G-RAN and the UPF operates in a 5G-CN. The relation between PDU session, QoS flows and DRBs is illustrated in FIG. 1. In this example, there is one network slice with a single PDU session established. The PDU session has three QoS flows where the first two are mapped to the same DRB while the third one is mapped to a separate DRB.

5G-RAN also updates the Radio Resource Control, RRC, state model and introduces a new state or mode called "RRC_INACTIVE", in addition to the existing RRC_IDLE and RRC_CONNECTED states inherited from Long Term Evolution, LTE. In RRC_INACTIVE state, the UE context from the previous RRC connection is stored in the RAN and the UE context can be re-used at the next RRC connection setup. The UE context could include information about UE security configuration, configured data radio bearer etc. By storing the UE context in the RAN, it is possible to avoid the substantial signaling otherwise required for security activation and bearer establishment which is normally required when transitioning from RRC_IDLE to RRC_CONNECTED. This improves latency and reduces the signaling overhead.

Figure 2:
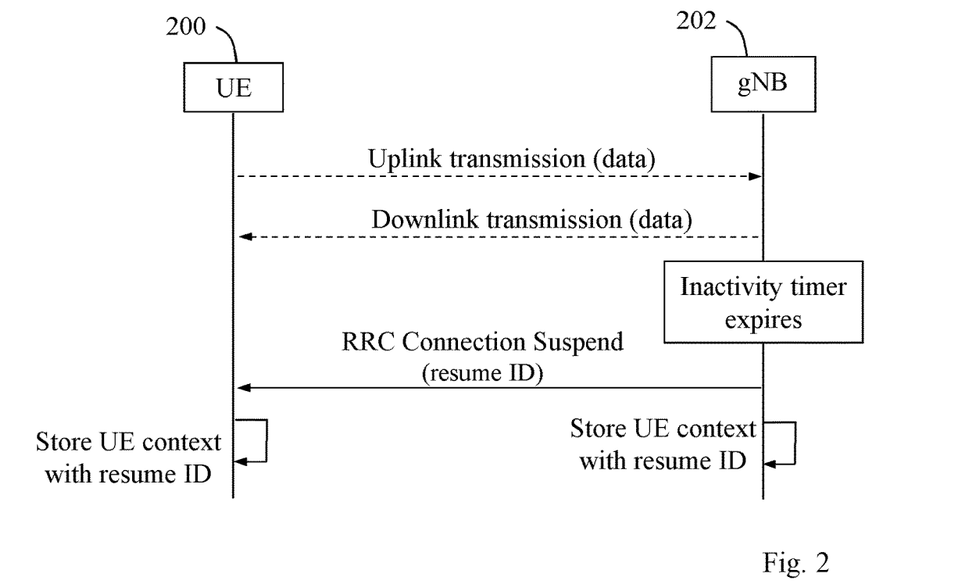
FIG. 2 is a signaling diagram illustrating that a UE enters RRC inactive state or mode, according to the prior art.

RRC_INACTIVE mode is realized by introducing two new procedures called "RRC Suspend" and "RRC Resume". In RRC Suspend, the gNB suspends a connection and moves the UE to RRC_INACTIVE by sending a "RRC Connection Suspend" message to the UE. This may happen for example after the UE has been inactive for a certain period according to expiry of an inactivity timer in the gNB, as illustrated in FIG. 2. As shown in this figure, both the UE 200 and the gNB 202 store the UE context and an associated identifier referred to as "Resume ID", which is provided by the gNB in the RRC Connection Suspend message and thus identifies the stored UE context. The UE context contains e.g. bearer configuration and security related parameters.

At the next transition to RRC_CONNECTED, the RRC Resume procedure is performed where the UE resumes the connection by sending a "RRC Connection Resume Request" to the gNB. Thereby, the UE will move from the inactive state to connected state. This Resume procedure is also illustrated in FIG. 3 and can be started when the UE 200 sends a random access preamble to the eNB 202 which responds with a random access response message, according to regular procedures for network access.

The above RRC Connection resume request message is sent from the UE 200 and contains the Resume ID that was previously received in the RRC connection suspend message, see FIG. 2. The gNB 202 then uses the Resume ID to retrieve the UE context in an action "Fetch stored UE context". The UE 200 likewise retrieves the UE context from its local memory in a similar action as indicated in the figure. The UE also provides in the resume request message an authentication token denoted "Auth token" to allow the gNB to securely identify the UE, and an establishment cause denoted "Est cause" indicating the reason for the connection. Assuming the UE context is found and the authorization token is valid, the gNB 202 responds with a "RRC Connection Resume Complete" to confirm that the connection has been resumed successfully. The UE in turn acknowledges the reception of this message by responding with a "RRC Connection Resume Complete" message.

Figure 4:
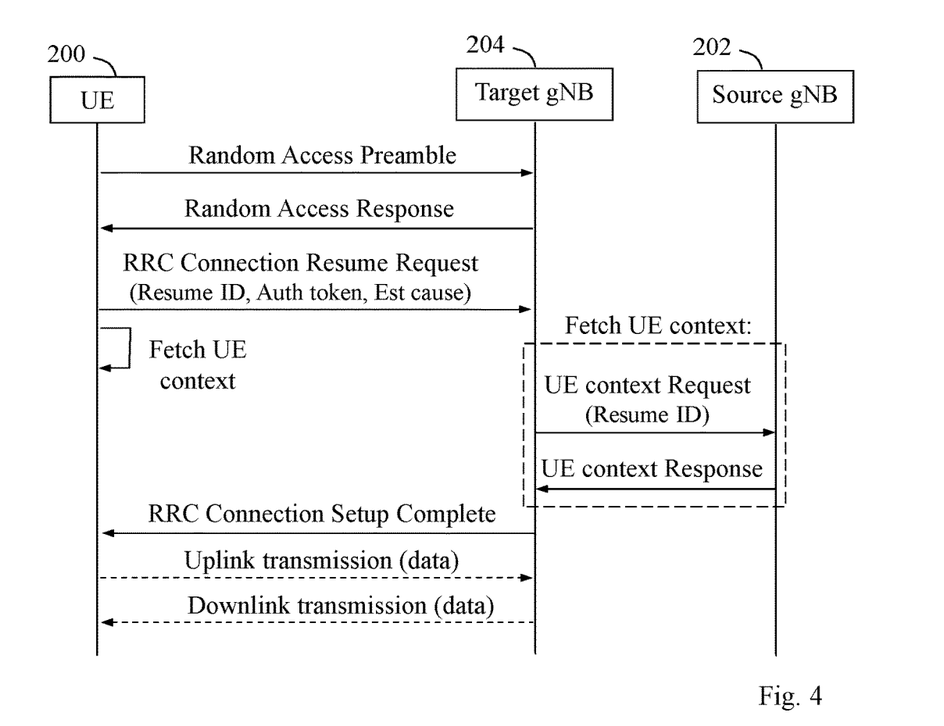
FIG. 4 is a signaling diagram illustrating a Resume procedure when the UE has changed its serving gNB from a source gNB to a target gNB, according to the prior art.

The RRC Resume procedure is not necessarily limited to a single cell or single gNB, but can also be supported across two or more gNBs, and an example of an RRC Resume procedure is shown in FIG. 4 where the UE 200 has changed its serving gNB from a source gNB 202 to a target gNB 204. Inter gNB connection resumption is handled using context fetching, whereby the resuming gNB, i.e. the Target gNB 204 in the figure, retrieves the UE context from the suspending gNB, i.e. the Source gNB 202 in the figure, over the Xn interface.

Figure 3:
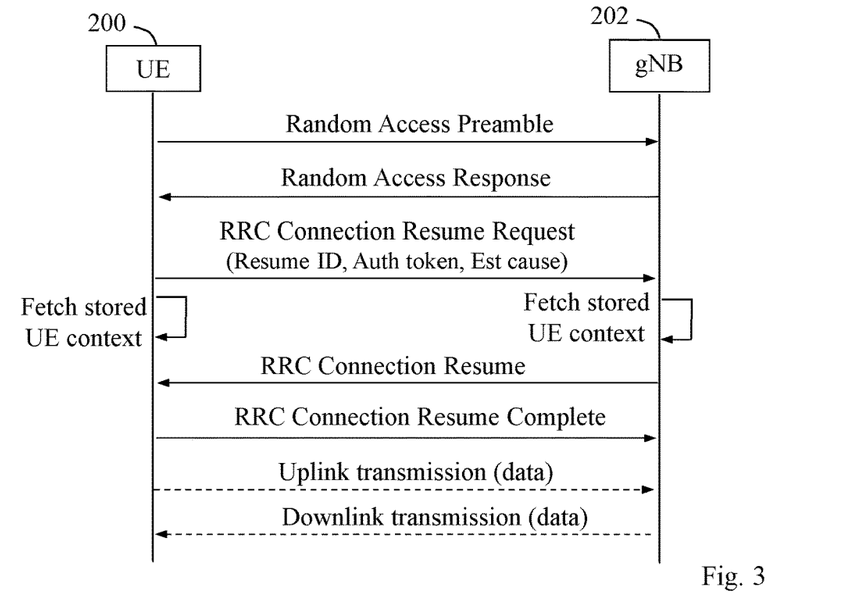
FIG. 3 is a signaling diagram illustrating a Resume procedure moving the UE from RRC inactive state or mode to RRC connected state or mode, according to the prior art.

As in FIG. 3, the UE 200 sends to the new serving gNB 204 the RRC Connection resume request containing the Resume ID. The serving and thus resuming gNB 204 provides the Resume ID which is used by the suspending gNB 202, to identify the UE context when the resuming gNB 204 fetches the UE context from the suspending gNB 202. The above Resume procedure could also be supported across multiple Radio Access Technologies, RATs, and an example may be that a session for a UE could be suspended in a New Radio (NR) RAT and then resumed in an LTE RAT.

When employing network slicing, it may be a problem that the eNB, such as eNB 202 in FIG. 3 or eNB 204 in FIG. 4, needs to select one or more network slices to apply for a UE returning to a connected state after being in the inactive state, such as when an RRC connection is resumed, e.g. according to FIG. 3 or FIG. 4. For example, requirements in the UE unknown to the eNB may govern which network slice is the most suitable. It may also be a problem that substantial amounts of time consuming signaling are required after resumed connection to find out which network slice(s) to use in the communication with the UE.

SUMMARY

It is an object of embodiments described herein to address at least some of the problems and issues outlined above. It is possible to achieve this object and others by using a wireless device, a network node and methods therein as defined in the attached independent claims.

According to one aspect, a method is performed by a wireless device which enables resuming a communication session after a period of inactivity. In this method, the wireless device sends to a network node a resuming request comprising an indication of at least one preferred network slice out of a set of network slices that was used in a communication session before a period of inactivity, to give information to the network node about which network slice(s) the wireless device prefers to use when resuming the communication session after the period of inactivity.

According to another aspect, a wireless device is arranged to resume a communication session in a wireless network after a period of inactivity. The wireless device is configured to send to a network node a resuming request comprising an indication of at least one preferred network slice out of a set of network slices that was used in the communication session before said period of inactivity. This functionality may be realized by means of a sending module in the wireless device.

According to another aspect, a method is performed by a network node which enables resuming a communication session for a wireless device after a period of inactivity of the wireless device. In this method, the network node receives from the wireless device a resuming request comprising an indication of at least one preferred network slice out of a set of network slices that was used in the communication session before the period of inactivity of the wireless device. The network node then determines the preferred network slice(s) based on the indication in the resuming request, for use when resuming the communication session for the wireless device after said period of inactivity.

According to another aspect, a network node is arranged to resume a communication session for a wireless device after a period of inactivity of the wireless device The network node is configured to receive from the wireless device a resuming request comprising an indication of at least one preferred network slice out of a set of network slices that was used in the communication session before said period of inactivity. The above receiving functionality may be realized by means of a receiving module in the network node. The network node is also configured to determine the preferred network slice(s) based on the indication in the resuming request, which functionality may be realized by means of a logic module in the network node.

The above wireless device, network node and methods can be used to solve the above-mentioned problem of requiring substantial amounts of time consuming signaling after the connection has been resumed to find out which network slice(s) to use in the communication session. It is thus an advantage that the network node can get information at an early stage about which network slice(s) the wireless device prefers to use when resuming the communication session. A further advantage is that the indication in the resuming request can be very brief since the network slice(s) and associated DRB(s) were registered when the communication session was executed before the period of inactivity.

The above wireless device, network node and methods may be configured and implemented according to different optional embodiments to accomplish further features and benefits, to be described below.

A computer program is also provided which comprises instructions which, when executed on at least one processor in either of the wireless device and the network node, cause the at least one processor to carry out either of the respective methods described above. A program carrier containing the above computer program is further provided, wherein the program carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 5:
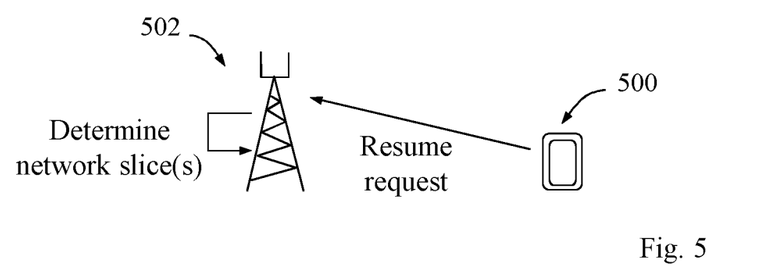
FIG. 5 is a communication scenario illustrating that a wireless device in inactive state or mode sends a resume request to a serving network node, where the solution may be used.

The embodiments described herein may be used in a procedure for resuming a communication session for a wireless device in a wireless network after the wireless device has had a period of inactivity, that is when the wireless device may be in the above-described inactive state, or RRC_INACTIVE. As illustrated in FIG. 5, the procedure involves a wireless device 500 in communication with a network node 502 of a wireless network. In this procedure, it is an advantage that the network node can get information at an early stage about which network slice(s) the wireless device prefers to use when resuming the communication session, and the network node is then able to act accordingly.

In this solution, it has been recognized that it is currently not possible for the RAN, such as the network node 502, to determine which network slice(s) the UE, such as the wireless device 500, wants to access when an RRC connection is resumed. Information about one or more network slices preferred by the UE can be useful to enable the RAN to set and use different priorities for different network slices, e.g. to make sure that users with low delay and high reliability requirements can access the system without being delayed e.g. by best effort traffic occupying available radio resources.

To enable the RAN to reject or prioritize UEs as early as possible, it is further recognized that the preferred network slice(s) should preferably be indicated by the UE already in the first RRC message (referred to as "MSG3") that is sent from the UE after a period of inactivity. This message is typically the above-mentioned RRC Connection Resume Request. However, since this message lacks segmentation it can only carry a very limited amount of information, and indicating the full network slice identifier in the message as used today is therefore presently not possible. It is therefore proposed that a shorter indication of the preferred network slice(s) can be used by the UE in a resuming request sent to the RAN, i.e. to the serving network node or gNB. For example, this short indication may comprise a DRB identifier associated with a preferred network slice since there is a distinctive and "unique" mapping or correspondence between DRB and network slice, as mentioned above. Alternatively, a brief index number of each preferred network slice may be included in the resuming request to identify the preferred network slice(s).

Figure 6A:
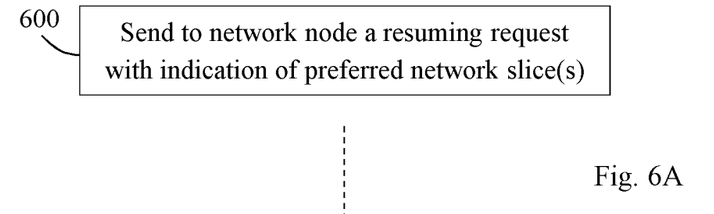
FIG. 6A is a flow chart illustrating a procedure in a wireless device, according to some example embodiments.

An example of how the solution may be employed in terms of a procedure performed by a wireless device for resuming a communication session in a wireless network after a period of inactivity, is illustrated by the flow chart in FIG. 6A. Some optional example embodiments that could be used in this procedure will also be described. Reference will also be made to FIG. 5.

It is assumed that the wireless device 500 is somehow triggered to resume connection with the wireless network in order to perform a communication. For example, this may be triggered when detecting that there is data pending in an uplink buffer in the wireless device 500, to be transmitted over the wireless network towards some destination such as another communication device or a server. Another possible trigger to resume connection may be that the wireless device 500 needs to transmit a signaling message to the network. The solution is however not limited to any particular reason or trigger for resuming the connection.

An action 600 illustrates that the wireless device 500 sends to a network node 502 a resuming request comprising an indication of at least one preferred network slice out of a set of network slices that was used in the communication session before said period of inactivity. Thereby, the network node 502 is able to determine the preferred network slice(s) based on the indication in the resuming request sent from the wireless device 500.

It is an advantage that the network node 502 can determine the preferred network slice(s) at an early stage without requiring substantial signaling. Another advantage is that the indication can be very brief since it only needs to identify a network slice in the set of network slices used in the communication session which is a limited number of network slices registered in the UE context, sometimes even only a single network slice. As it is sufficient to indicate one or a few of the registered slices, it may thus be possible to accommodate this brief indication in an existing format of the resuming request. For example, a brief index number may have been assigned to each network slice in the set, which may be used as the above indication. Since the UE context is fetched after the resuming request, see FIGS. 3 and 4, the network slice(s) that the wireless device 500 is registered to is/are indicated in the UE context and will thus be revealed to the network node 502.

Some optional example embodiments that could be used in the above procedure in the wireless device 500 will now be described. In one example embodiment, the indication in the resuming request may comprise a Data Radio Bearer (DRB) identifier associated with each preferred network slice. In that case, another example embodiment may be that each DRB identifier is an index number of a respective DRB being used in the communication session before said period of inactivity. As explained above, the indication may be comprised of just a few bits that can easily be accommodated in an existing resuming request, since there is only a limited number of network slices in the set of network slices that was used in the communication session before said period of inactivity.

In another alternative embodiment, said indication may comprise an index number of each preferred network slice. In either of the latter two embodiments, another example embodiment may be that each index number refers to a bitmap where each bit corresponds to a network slice or DRB registered for the communication session before said period of inactivity.

In another example embodiment, the resuming request may be the first RRC message after the period of inactivity, sometimes referred to as the RRC message MSG3. In that case, another example embodiment may be that the resuming request is an RRC Connection Resume Request which is sent by the wireless device 500 when being in RRC inactive state or mode.

Figure 6B:
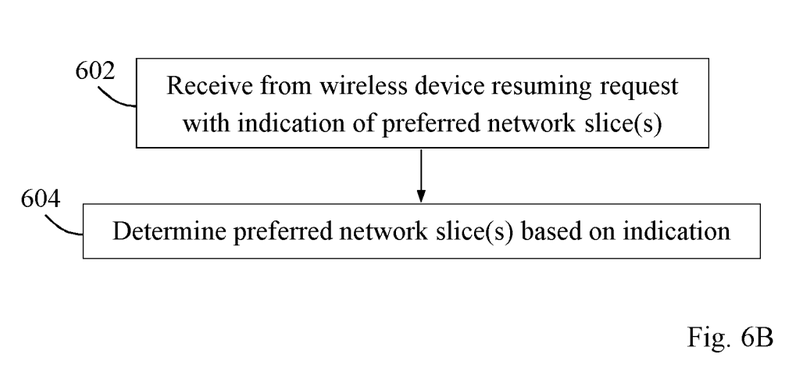
FIG. 6B is a flow chart illustrating a procedure in a network node following the procedure of FIG. 6A, according to further example embodiments.

Another example of how the solution may be employed in terms of actions performed by a network node 502 in a wireless network, is further illustrated by the flow chart in FIG. 6B which will now be described likewise with further reference to FIG. 5. FIG. 6B thus illustrates a procedure in the network node 502 for resuming a communication session for a wireless device 500 after a period of inactivity of the wireless device 500.

A first action 602 illustrates that the network node 502 receives from the wireless device 500 a resuming request comprising an indication of at least one preferred network slice out of a set of network slices that was used in the communication session before said period of inactivity. In another action 604, the network node 502 determines the preferred network slice(s) based on the indication in the resuming request.

Some optional example embodiments that could be used in the above procedure in the network node 502 will now be described, and these embodiments correspond to the example embodiments described above for the procedure in the wireless device. In one example embodiment, said indication may comprise a Data Radio Bearer (DRB) identifier associated with each preferred network slice. In that case, another example embodiment may be that each DRB identifier is an index number of a respective DRB being used in the communication session before said period of inactivity. In another alternative embodiment, said indication may comprise an index number of each preferred network slice. In either of the latter two embodiments, another example embodiment may be that each index number refers to a bitmap where each bit corresponds to a network slice or DRB registered for the communication session before said period of inactivity.

In another example embodiment, the resuming request may be the first RRC message from the wireless device 500 after the period of inactivity. In that case, another example embodiment may be that the resuming request is an RRC Connection Resume Request which is received from the wireless device 500 when being in RRC inactive state or mode.

In either of the above procedures in FIGS. 6A-6B, it is an advantage that the indication in the resuming request can be very brief since the network slices and associated Data Radio Bearers DRB are registered when the communication session was executed before the period of inactivity. Another advantage is that the network node can get information about which network slice(s) the wireless device prefers to use at an early stage.

Figure 7:
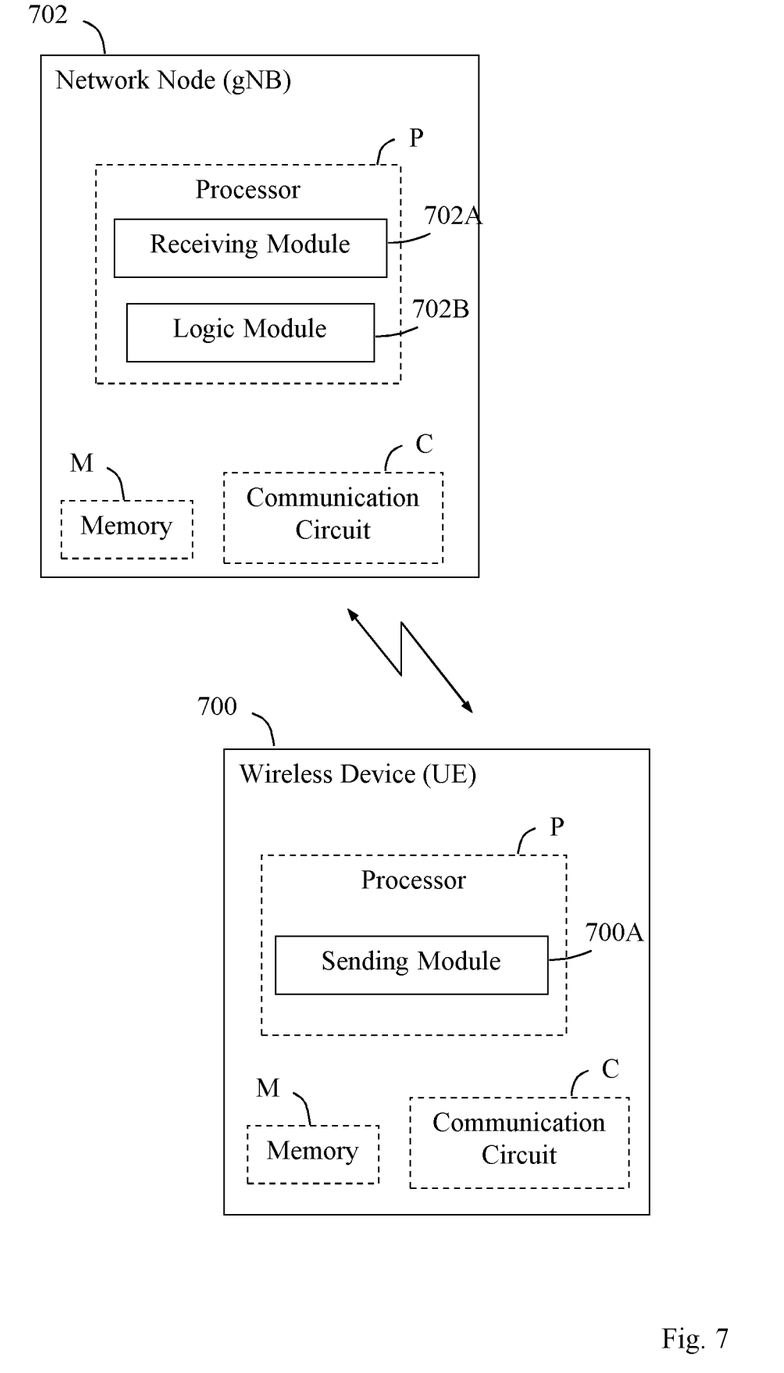
FIG. 7 is a block diagram illustrating how a wireless device and a network node may be structured, according to further example embodiments.

The block diagram in FIG. 7 illustrates a detailed but non-limiting example of how a wireless device 700 and a network node 702, respectively, may be structured to bring about the above-described solution and embodiments thereof. In this figure, the wireless device 700 and the network node 702 may be configured to operate according to any of the examples and embodiments of employing the solution as described herein, where appropriate. Each of the wireless device 700 and the network node 702 is shown to comprise a processor "P", a memory "M" and a communication circuit "C" with suitable equipment for transmitting and receiving radio signals in the manner described herein.

The communication circuit C in each of the wireless device 700 and the network node 702 thus comprises equipment configured for communication with each other using a suitable protocol for the communication depending on the implementation. The solution is however not limited to any specific types of radio signals or protocols, even though RRC was used above as an example.

The wireless device 700 is, e.g. by means of units, modules or the like, configured or arranged to perform the procedure in the flow chart in FIG. 6A as follows. Further, the network node 702 is, e.g. by means of units, modules or the like, configured or arranged to perform the procedure in the flow chart in FIG. 6B as follows.

The wireless device 700 is arranged to resume a communication session in a wireless network after a period of inactivity. The wireless device 700 is configured to send to a network node 702 a resuming request comprising an indication of at least one preferred network slice out of a set of network slices that was used in the communication session before said period of inactivity. This operation may be performed by a sending module 700A in the wireless device 700, as illustrated in action 600.

The network node 702 is arranged to resume a communication session for a wireless device 700 after a period of inactivity of the wireless device 700. The network node 702 is configured to receive from the wireless device 700 a resuming request comprising an indication of at least one preferred network slice out of a set of network slices that was used in the communication session before said period of inactivity. This operation may be performed by a receiving module 702A in the network node 702 as illustrated in action 602.

The network node 702 is also configured to determine the preferred network slice(s) based on the indication in the resuming request. This operation may be performed by a logic module 702B in the network node 702 as illustrated in action 604. The logic module 702B could alternatively be named a determining module or controlling module.

It should be noted that FIG. 7 illustrates various functional modules in the wireless device 700 and the network node 702, respectively, and the skilled person is able to implement these functional modules in practice using suitable software and hardware equipment. Thus, the solution is generally not limited to the shown structures of the wireless device 700 and the network node 702, and the functional modules therein may be configured to operate according to any of the features, examples and embodiments described in this disclosure, where appropriate.

The functional modules 700A and 702A-B described above may be implemented in the wireless device 700 and the network node 702, respectively, by means of program modules of a respective computer program comprising code means which, when run by the processor P causes the wireless device 700 and the network node 702 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the wireless device 700 and the network node 702 in the form of a memory having a computer readable medium and being connected to the processor P. The computer program product or memory M in each of the wireless device 700 and the network node 702 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective wireless device 700 and network node 702.

The solution described herein may be implemented in each of the wireless device 700 and the network node 702 by a computer program comprising instructions which, when executed on at least one processor, cause the at least one processor to carry out the actions according to any of the above embodiments and examples, where appropriate. The solution may also be implemented, for each of the wireless device 700 and the network node 702, in a carrier containing the above computer program, wherein the carrier is one of an electronic signal, optical signal, radio signal, or computer readable storage medium.

Some further features, details and advantages of the embodiments herein will now be described in more detail. In the following examples, it is assumed that RRC is used in a communication between a wireless device and a network node, and that the described resuming request is an RRC Connection Resume Request which is sent by the wireless device when being in the RRC_INACTIVE state or mode. The wireless device will be referred to as UE and the network node will be referred to as gNB.

For UEs in RRC_INACTIVE state, it is possible to provide more detailed information in the above first message MSG3 about which network slice(s) the UE is attempting to access. MSG3 still has the same size limitation but since the UE context is retrieved by the gNB after receiving the MSG3, the network slice(s) the UE is registered to will be known to the gNB at this point. To indicate which network slice(s) the UE is attempting to access, it is therefore sufficient to indicate which one or more of the registered slices the access is requested for. Since there is a unique mapping between DRB and network slice, this can be done by including the associated DRB ID(s) in MSG3. Alternatively, the UE can also provide the index of the network slice(s) it wants to access.

Indicating the preferred network slice(s) during RRC connection resume enables RAN to provide differentiated treatment to different network slices. This can e.g. be used to ensure that users with low delay and high reliability requirements can access the system without being delayed by best effort traffic. Since the UE in the 3$^{rd}$ Generation Partnership Project, 3GPP, standard can only be configured with a limited number of DRBs, adding a DRB identifier to the initial RRC message (MSG3) does not add much overhead in terms of extra bits. For example, if the maximum number of DRBs is 8, only 3 bits are required. If the maximum number of DRBs is 16, 4 bits are needed to uniquely identify them. Currently in LTE, the UE can only be assigned up to 8 DRBs.

Figure 8:
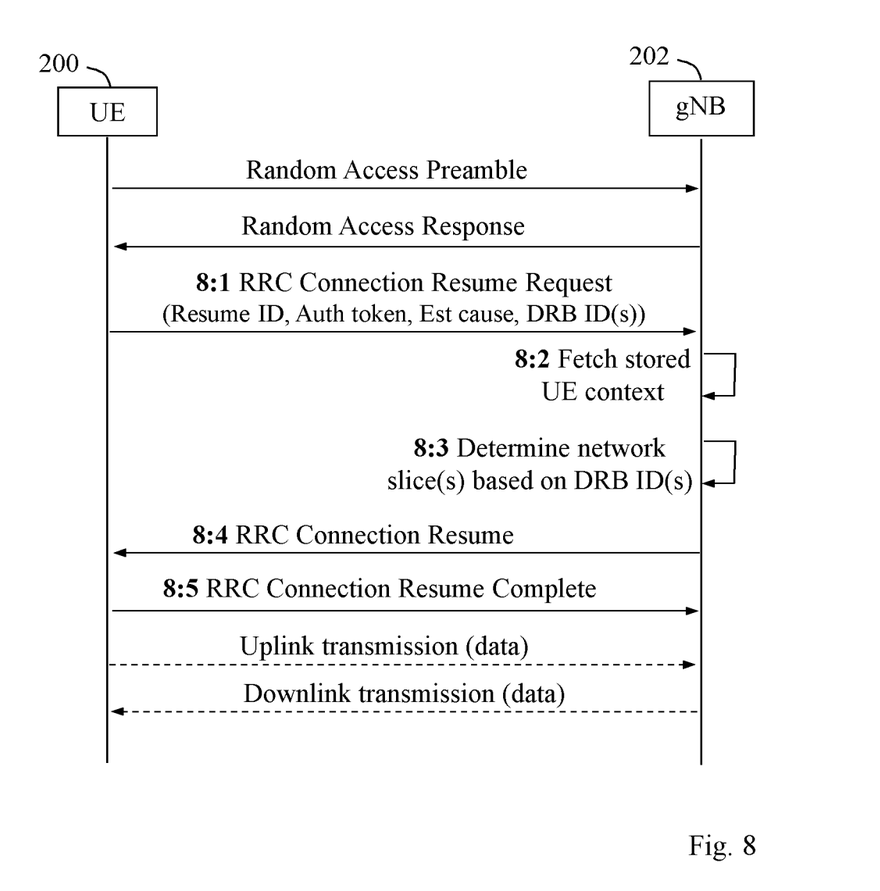
FIG. 8 is a signaling diagram illustrating a resume procedure where the solution is employed, according to further example embodiments.

A detailed description of how the network slice can be indicated by a UE 200 during the RRC_INACTIVE to RRC_CONNECTED mode transition is given below with reference to the following operations 8:1-8:5 which are illustrated in FIG. 8 which may be preceded by a random access preamble from the UE and a random access response from the gNB.

8:1. The UE 200 is in RRC_INACTIVE mode after being in RRC connected state, which means that the UE context identified by a Resume ID is stored in the UE and in RAN, i.e. in the gNB. In response to some trigger (e.g. new data arrives in the UL buffer), the UE 200 decides to resume the RRC connection by sending a RRC connection resume request to the gNB 202. The UE includes the Resume ID, an authentication token, the establishment cause and the DRB ID(s) in this message. The latter is the above-described indication of preferred network slice(s) which is thus used to indicate which of the established radio bearers, corresponding to network slices, the UE wishes to resume. The DRB ID could be the full DRB ID allocated to the UE, or it could be an index value indicating the DRB (e.g. index 0 indicates a first DRB on the DRB list that the UE has been configured with, and so forth).

Alternatively, instead of indicating the network slice indirectly via the DRB ID, the UE 200 can also indicate the network slice directly by providing a network slice index. If the UE can be registered with at most 8 network slices simultaneously, this indication can be achieved by e.g. including an 8 bit bitmap where a bit in the bitmap corresponds to one of the registered network slices.

8:2. The gNB retrieves the UE context using the Resume ID provided by the UE in the above RRC connection resume request.

8:3. The gNB 202 determines the network slice(s) that the UE is attempting to access, i.e. the above-described at least one preferred network slice, based on the DRB ID(s) and by utilizing the unique mapping between DRB ID and network slice.

8:4. The gNB 202 sends a RRC Connection Resume message to indicate that the connection is being resumed. If needed this message can be used to re-configure the UE.

8:5. The UE acknowledges the reception by sending "RRC Connection Resume Complete". This message may not be strictly necessary as acknowledgement is also done at lower layers.

While the solution has been described with reference to specific exemplifying embodiments, the description is generally only intended to illustrate the inventive concept and should not be taken as limiting the scope of the solution. For example, the terms "network node", "wireless device", "network slice", "resuming request", "indication", "Data Radio Bearer (DRB)", "index number", "inactive state" and "connected state" have been used throughout this disclosure, although any other corresponding entities, functions, and/or parameters could also be used having the features and characteristics described here. The solution may be implemented according to the appended claims.

Further Extensions and Variations

Some further variations and extensions of the examples and embodiments herein will now be described with reference to FIGS. 9-14.

Figure 9:
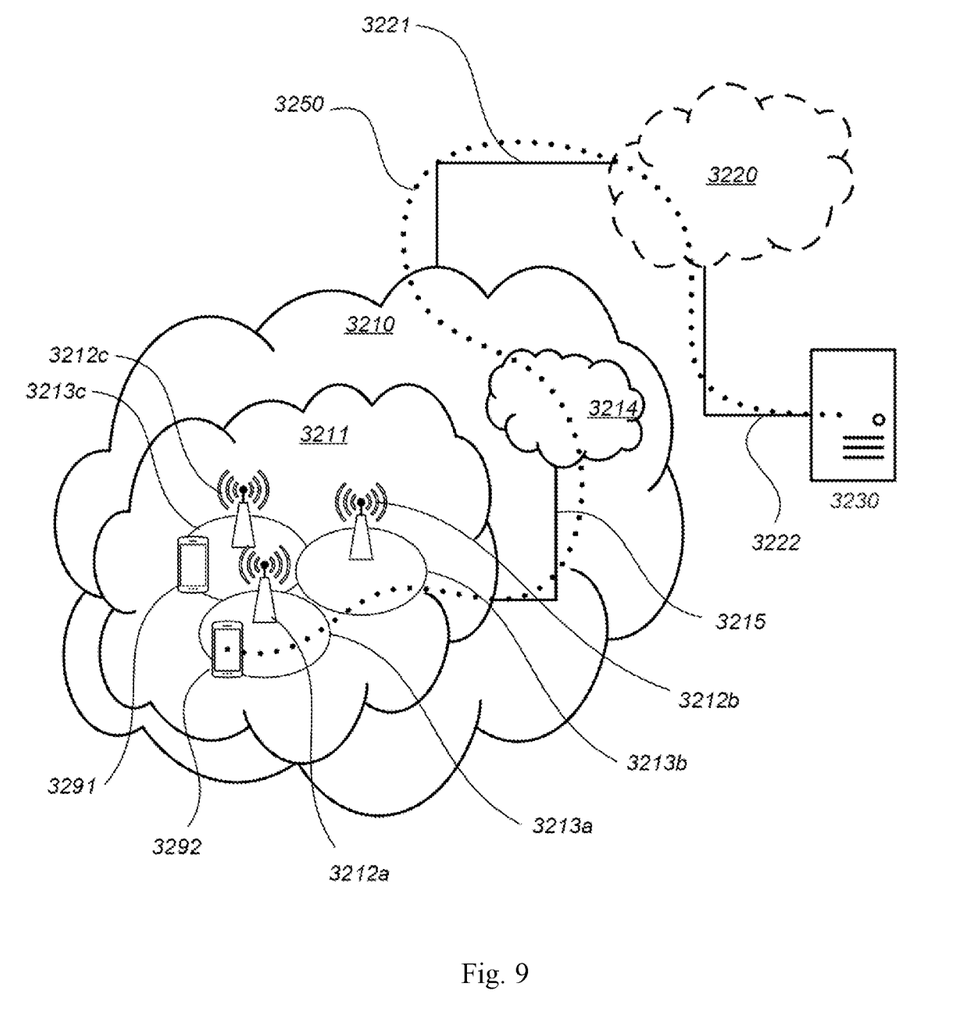
FIG. 9 illustrates a communication system where the embodiments and examples herein may be used.

With reference to FIG. 9, in accordance with an embodiment, a communication system includes a telecommunication network 3210 e.g. a WLAN, such as a 3GPP-type cellular network, which comprises an access network 3211, such as a radio access network, and a core network 3214. The access network 3211 comprises a plurality of base stations 3212a, 3212b, 3212c, such as access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
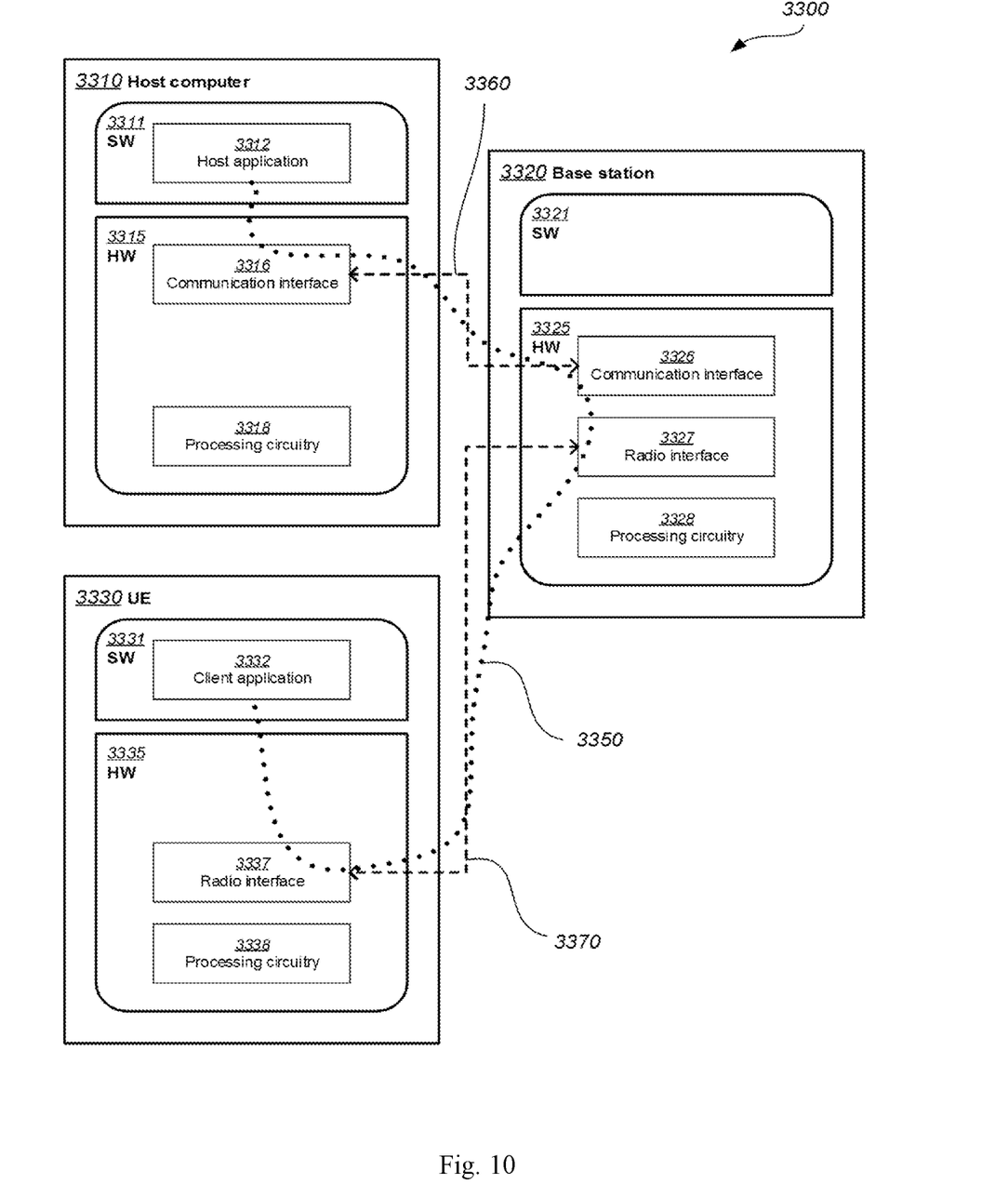
FIG. 10 illustrates a host computer, a base station and a UE where the embodiments and examples herein may be used.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate and reduce latency and/or power consumption since the base station 3320 can determine the preferred network slice(s) at an early stage without requiring substantial signaling and thereby provide benefits such as reduced user waiting time, better responsiveness and/or extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art.

In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 11:
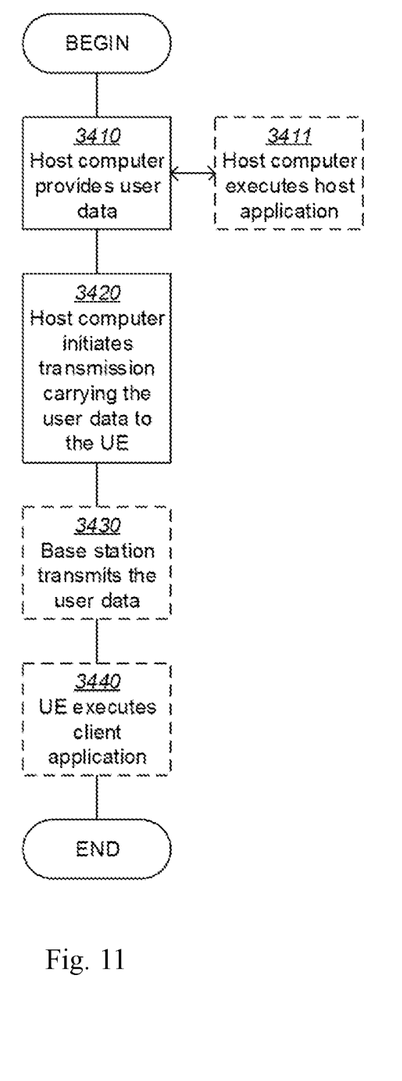
FIG. 11 is a flowchart illustrating a method implemented in a communication system, in accordance with one embodiment.

FIG. 11 is a flowchart illustrating a method implemented in a communication system, in accordance with one embodiment. The communication system includes a host computer, a base station such as a AP STA, and a UE such as a Non-AP STA which may be those described with reference to FIGS. 9 and 10. For simplicity of the present disclosure, only drawing references to FIG. 11 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

Figure 12:
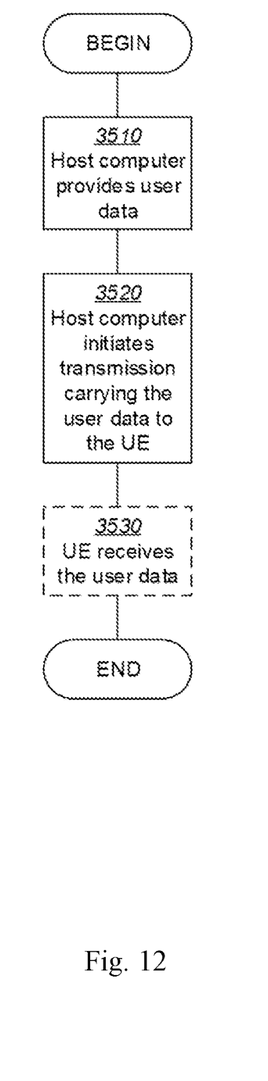
FIG. 12 is a flowchart illustrating a method implemented in a communication system, in accordance with another embodiment.

FIG. 12 is a flowchart illustrating a method implemented in a communication system, in accordance with one embodiment. The communication system includes a host computer, a base station such as a AP STA, and a UE such as a Non-AP STA which may be those described with reference to FIGS. 9 and 10. For simplicity of the present disclosure, only drawing references to FIG. 12 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figure 13:
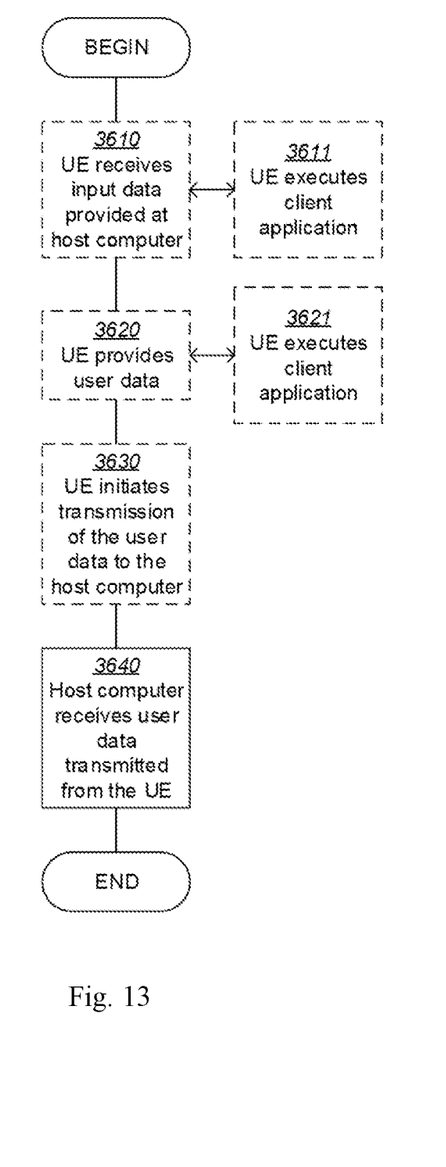
FIG. 13 is a flowchart illustrating a method implemented in a communication system, in accordance with another embodiment.

FIG. 13 is a flowchart illustrating a method implemented in a communication system, in accordance with one embodiment. The communication system includes a host computer, a base station such as a AP STA, and a UE such as a Non-AP STA which may be those described with reference to FIGS. 9 and 10. For simplicity of the present disclosure, only drawing references to FIG. 13 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

Figure 14:
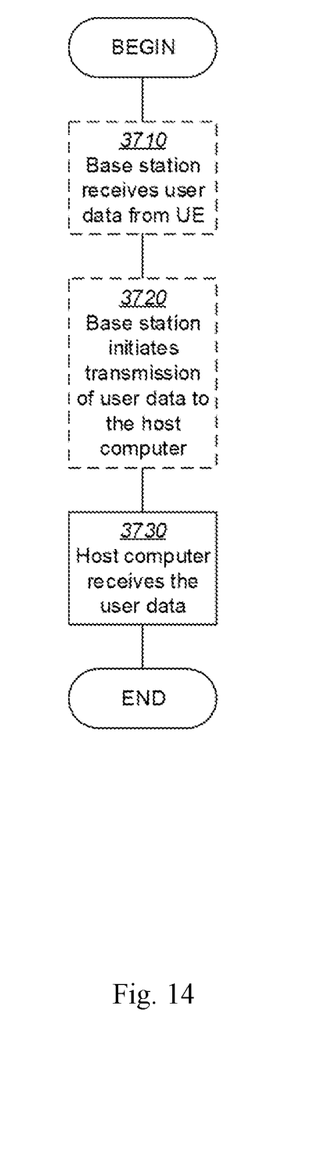
FIG. 14 is a flowchart illustrating a method implemented in a communication system, in accordance with another embodiment.

FIG. 14 is a flowchart illustrating a method implemented in a communication system, in accordance with one embodiment. The communication system includes a host computer, a base station such as a AP STA, and a UE such as a Non-AP STA which may be those described with reference to FIGS. 9 and 10. For simplicity of the present disclosure, only drawing references to FIG. 14 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

Some numbered example embodiments of the solution will now be outlined as further suggestions of how an apparatus may be configured to implement the above-described wireless device and network node, respectively.

Embodiment 1: A wireless device (700) comprising processing circuitry configured to:

send to a network node (702) a resuming request comprising an indication of at least one preferred network slice out of a set of network slices that was used in the communication session before said period of inactivity.

Embodiment 2: A wireless device (700) according to embodiment 1, wherein said indication comprises a Data Radio Bearer (DRB) identifier associated with each preferred network slice.

Embodiment 3: A wireless device (700) according to embodiment 2, wherein each DRB identifier is an index number of a respective DRB being used in the communication session before said period of inactivity.

Embodiment 4: A wireless device (700) according to embodiment 1, wherein said indication comprises an index number of each preferred network slice.

Embodiment 5: A wireless device (700) according to embodiment 3 or 4, wherein each index number refers to a bitmap where each bit corresponds to a network slice or DRB registered for the communication session before said period of inactivity.

Embodiment 6: A wireless device (700) according to any of embodiments 1-5, wherein the resuming request is the first RRC message after the period of inactivity.

Embodiment 7: A wireless device (700) according to embodiment 6, wherein the resuming request is an RRC Connection Resume Request which is sent by the wireless device (700) when being in RRC inactive state or mode.

Embodiment 8: A network node (702) comprising processing circuitry configured to:
receive from the wireless device (700) a resuming request comprising an indication of at least one preferred network slice out of a set of network slices that was used in the communication session before said period of inactivity, and
determine the preferred network slice(s) based on the indication in the resuming request.

Embodiment 9: A network node (702) according to embodiment 8, wherein said indication comprises a Data Radio Bearer (DRB) identifier associated with each preferred network slice.

Embodiment 10: A network node (702) according to embodiment 9, wherein each DRB identifier is an index number of a respective DRB being used in the communication session before said period of inactivity.

Embodiment 11: A network node (702) according to embodiment 8, wherein said indication comprises an index number of each preferred network slice.

Embodiment 12: A network node (702) according to embodiment 10 or 11, wherein each index number refers to a bitmap where each bit corresponds to a network slice or DRB registered for the communication session before said period of inactivity.

Embodiment 13: A network node (702) according to any of embodiments 8-12, wherein the resuming request is the first RRC message from the wireless device (700) after the period of inactivity.

Embodiment 14: A network node (702) according to embodiment 13, wherein the resuming request is an RRC Connection Resume Request which is received from the wireless device (700) when being in RRC inactive state or mode.

Embodiment 15: A wireless device (700) arranged to resume a communication session in a wireless network after a period of inactivity, the wireless device (700) comprising:
a sending module (700A) configured to send to a network node (702) a resuming request comprising an indication of at least one preferred network slice out of a set of network slices that was used in the communication session before said period of inactivity.

Embodiment 16: A wireless device (700) according to embodiment 15, wherein said indication comprises a Data Radio Bearer (DRB) identifier associated with each preferred network slice.

Embodiment 17: A wireless device (700) according to embodiment 16, wherein each DRB identifier is an index number of a respective DRB being used in the communication session before said period of inactivity.

Embodiment 18: A wireless device (700) according to embodiment 15, wherein said indication comprises an index number of each preferred network slice.

Embodiment 19: A wireless device (700) according to embodiment 17 or 18, wherein each index number refers to a bitmap where each bit corresponds to a network slice or DRB registered for the communication session before said period of inactivity.

Embodiment 20: A wireless device (700) according to any of embodiments 15-19, wherein the resuming request is the first RRC message after the period of inactivity.

Embodiment 21: A wireless device (700) according to embodiment 20, wherein the resuming request is an RRC Connection Resume Request which is sent by the wireless device (700) when being in RRC inactive state or mode.

Embodiment 22: A network node (702) arranged to resume a communication session for a wireless device (700) after a period of inactivity of the wireless device (700), the network node (702) comprising:
a receiving module (702A) configured to receive from the wireless device (700) a resuming request comprising an indication of at least one preferred network slice out of a set of network slices that was used in the communication session before said period of inactivity, and
a logic module (702B) configured to determine the preferred network slice(s) based on the indication in the resuming request.

Embodiment 23: A network node (702) according to embodiment 22, wherein said indication comprises a Data Radio Bearer (DRB) identifier associated with each preferred network slice.

Embodiment 24: A network node (702) according to embodiment 23, wherein each DRB identifier is an index number of a respective DRB being used in the communication session before said period of inactivity.

Embodiment 25: A network node (702) according to embodiment 22, wherein said indication comprises an index number of each preferred network slice.

Embodiment 26: A network node (702) according to embodiment 24 or 25, wherein each index number refers to a bitmap where each bit corresponds to a network slice or DRB registered for the communication session before said period of inactivity.

Embodiment 27: A network node (702) according to any of embodiments 22-26, wherein the resuming request is the first RRC message from the wireless device (700) after the period of inactivity.

Embodiment 28: A network node (702) according to embodiment 27, wherein the resuming request is an RRC Connection Resume Request which is received from the wireless device (700) when being in RRC inactive state or mode.

The invention claimed is:
1. A method performed by a wireless device, the method comprising:
registering to use one or more network slices for a communication session on a network, each of the one or more network slices having a corresponding at least one of a Data Radio Bearer (DRB) identifier and an index number;
entering an inactive state for a communication session with the network;
after a period of inactivity, determining to resume the communication session with the network;
upon determining to resume the communication with the network:
  determining at least one registered network slice that the wireless device prefers to use, the determination of the at least one registered network slice that the wireless device prefers to use being based on one of data and a signaling message to be transmitted, and the determined at least one registered network slice comprising at least one of the Data Radio Bearer (DRB) identifier associated and an index number of each network slice that the wireless device prefers to use; and
  sending, to a network node, a request to resume the communication session with the network, the request comprising the determined ones of the registered network slices that the wireless device prefers to use upon resuming the communication session after the period of inactivity; and
receiving, from the network node, an indication that the communication session is being resumed and that the wireless device is to use one of the registered network slices that were indicated as preferred.

2. The method of claim 1, wherein each DRB identifier is an index number of a respective DRB being used in the communication session before said period of inactivity.

3. The method of claim 1, wherein each index number refers to a bitmap in which each bit corresponds to a network slice or DRB registered for the communication session before said period of inactivity.

4. The method of claim 1, wherein:
the resuming request is an RRC Connection Resume Request;
the RRC Connection Resume Request is the first RRC message received from the wireless device after the period of inactivity; and
the RRC Connection Resume Request is received while the wireless device is in RRC_INACTIVE state.

5. A wireless device comprising:
communication circuitry configured to communicate with a wireless network; and
processing circuitry operably coupled to the communication circuitry, the processing circuitry and the communication circuitry being configured to:
  register to use one or more network slices for a communication session on a network, each of the one or more network slices having a corresponding at least one of a Data Radio Bearer (DRB) identifier and an index number;
  enter an inactive state for a communication session with the network;
  after a period of inactivity, determine to resume the communication session with the network;
  upon determining to resume the communication with the network:
    determine at least one registered network slice that the wireless device prefers to use, the determination of the at least one registered network slice that the wireless device prefers to use being based on one of data and a signaling message to be transmitted, and the determined at least one registered network slice comprising at least one of the Data Radio Bearer (DRB) identifier associated and an index number of each network slice that the wireless device prefers to use; and
    send, to a network node, a request to resume the communication session with the network, the request comprising the determined ones of the registered network slices that the wireless device prefers to use upon resuming the communication session after the period of inactivity; and
  receive, from the network node, an indication that the communication session is being resumed and that the wireless device is to use one of the registered network slices that were indicated as preferred.

6. The wireless device of claim 5, wherein each DRB identifier is an index number of a respective DRB being used in the communication session before said period of inactivity.

7. The wireless device of claim 5, wherein each index number refers to a bitmap where each bit corresponds to a network slice or DRB registered for the communication session before said period of inactivity.

8. The wireless device of claim 6, wherein:
the resuming request is an RRC Connection Resume Request;
the wireless device is configured so that the RRC Connection Resume Request is the first RRC message sent by the wireless device after the period of inactivity; and
the wireless device is configured to send the RRC Connection Resume Request while the wireless device is in RRC_INACTIVE state.

9. A non-transitory, computer-readable medium storing program instructions that, when executed by processing circuitry of a wireless device, configure the wireless device to perform operations corresponding to the method of claim 1.

10. The method of claim 1, further comprising the step of receiving, from the network node, an indication that the communication session is being resumed and that the wireless device is to use one of the registered network slices that were indicated as preferred.

* * * * *